United States Patent
Woo et al.

(10) Patent No.: US 8,755,086 B2
(45) Date of Patent: Jun. 17, 2014

(54) IMAGE FORMING APPARATUS AND CONTROL METHOD THEREOF WHICH EXECUTE AUTO COLOR REGISTRATION

(75) Inventors: Sang Bum Woo, Suwon-si (KR); Hyun Ki Cho, Hanam-si (KR); Jong Tae Kim, Kwachun-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/585,312

(22) Filed: Aug. 14, 2012

(65) Prior Publication Data

US 2013/0050723 A1 Feb. 28, 2013

(30) Foreign Application Priority Data

Aug. 23, 2011 (KR) .................. 10-2011-0084055

(51) Int. Cl.
*G06K 15/22* (2006.01)
*G06K 15/10* (2006.01)
*H04N 1/60* (2006.01)
*H04N 1/405* (2006.01)
*H04N 1/46* (2006.01)

(52) U.S. Cl.
USPC ............... 358/1.9; 358/1.4; 358/1.5; 358/3.1; 358/504

(58) Field of Classification Search
USPC ......... 358/1.9, 515, 518, 3.23, 521, 501, 519, 358/401, 405, 537, 3.1, 3.02, 466, 1.4, 1.5, 358/2.1, 3.09; 399/101, 301, 46, 167, 40, 399/49, 71, 78, 15, 158, 178, 182, 321, 297, 399/298, 299, 300, 302, 303, 304, 305, 306, 399/333; 382/164, 167, 278, 307, 309, 312

See application file for complete search history.

(56) References Cited

U.S. PATENT DOCUMENTS

| | | | |
|---|---|---|---|
| 2005/0225587 A1* | 10/2005 | Hoffmann et al. | 347/19 |
| 2008/0089704 A1* | 4/2008 | Jeon | 399/40 |
| 2008/0170892 A1* | 7/2008 | Park | 399/301 |
| 2009/0035030 A1* | 2/2009 | Bae et al. | 399/301 |
| 2010/0178083 A1* | 7/2010 | Lee | 399/301 |
| 2010/0178084 A1* | 7/2010 | Kang et al. | 399/301 |
| 2011/0097119 A1* | 4/2011 | Cho et al. | 399/301 |

\* cited by examiner

*Primary Examiner* — Ngon Nguyen
(74) *Attorney, Agent, or Firm* — Staas & Halsey LLP

(57) ABSTRACT

An image forming apparatus and a control method thereof which execute auto color registration in consideration of mechanical change factors of both photoconductors and drive rollers. The control method of an image forming apparatus includes photoconductors, an intermediate transfer belt to which developers attached to the photoconductors are transferred, and drive rollers to drive the intermediate transfer belt, test patterns are printed on the intermediate transfer belt by adjusting a printing time interval of the test patterns according to a spatial period of the photoconductors and a spatial period of the drive rollers, if conditions to execute auto color registration (ACR) are satisfied, and ACR is executed according to a signal reflected by the test patterns.

16 Claims, 25 Drawing Sheets

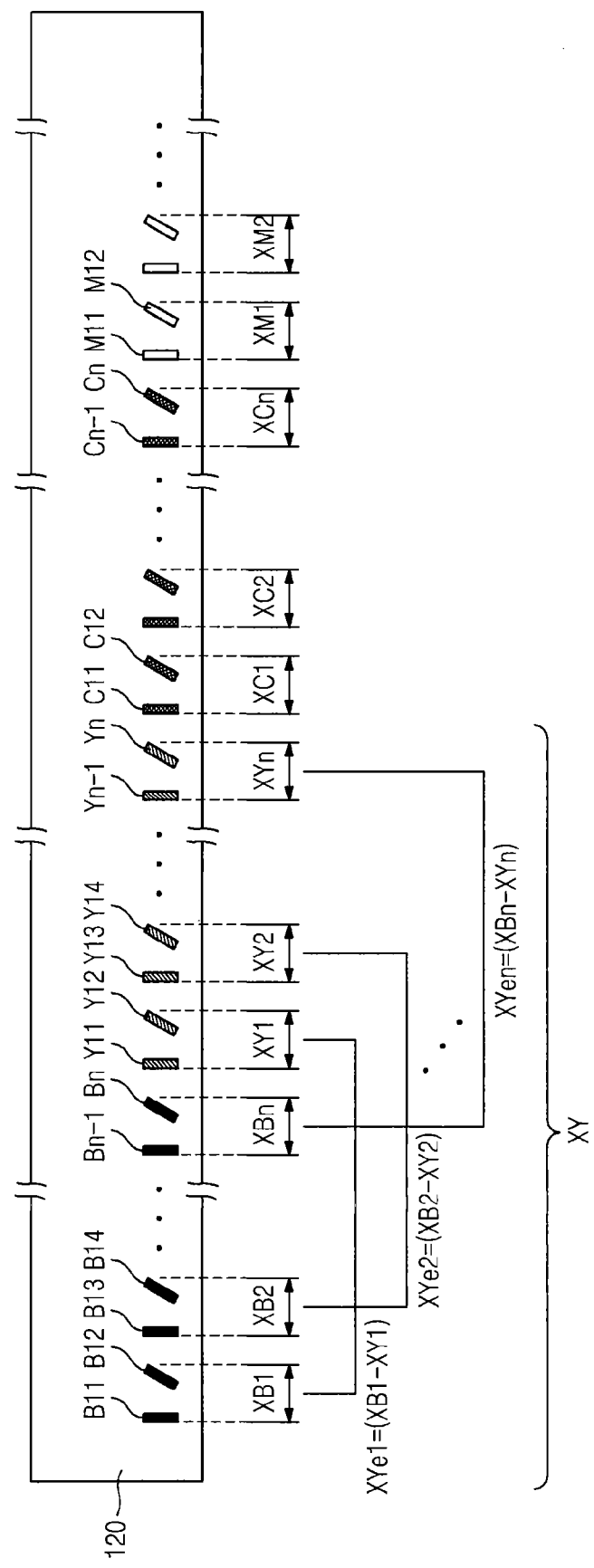

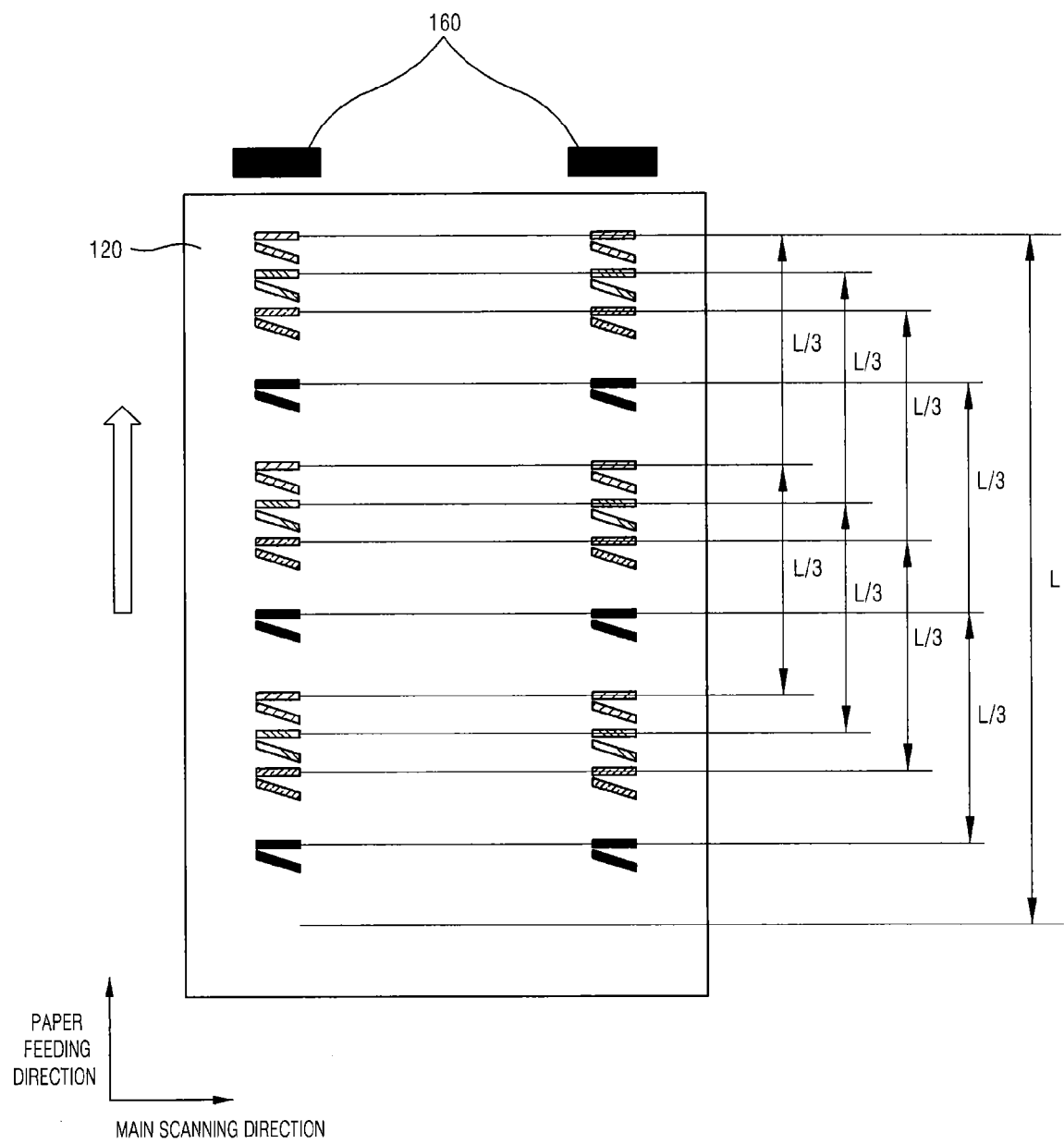

IMAGE FORMING APPARATUS AND CONTROL METHOD THEREOF WHICH EXECUTE AUTO COLOR REGISTRATION

CROSS-REFERENCE TO RELATED APPLICATIONS

This application claims the benefit of Korean Patent Application No. 2011-0084055, filed on Aug. 23, 2011 in the Korean Intellectual Property Office, the disclosure of which is incorporated herein by reference.

BACKGROUND

1. Field

Embodiments of the present disclosure relate to an image forming apparatus and a control method thereof which execute auto color registration.

2. Description of the Related Art

In general, a color image forming apparatus prints an image on a sheet of paper using four colors, e.g., yellow, magenta, cyan and black. The color image forming apparatus executes auto color registration (ACR) to precisely register respective colors at desired positions of a sheet of paper. Through ACR, relative positions of the four colors are compensated such that images of the four colors are correctly registered on the sheet of paper. Further, through ACR, test patterns of the respective colors are printed one by one on printing medium, intervals between the test patterns of the respective colors are detected, and a distortion degree is compensated according to a result of the detection.

After conditions to execute ACR are set, the color image forming apparatus executes ACR if a current state satisfies the set conditions. These conditions may include a case in which a temperature variation of a laser scanning unit (LSU) for a specific time is greater than a reference value, a case in which the total number of printed sheets of paper becomes twice a set number, a case in which a cover of the apparatus is opened or closed, and a case in which consumption goods, such as a toner, are replaced.

Further, the conventional image forming apparatus executes ACR under the condition that a mechanical change factor due to photoconductors or drive rollers is not considered, or executes ACR under the condition that the mechanical change factor due to only one of the photoconductors and the drive rollers is considered.

SUMMARY

Therefore, it is an aspect of the present disclosure to provide an image forming apparatus and a control method thereof which execute auto color registration (ACR) in consideration of mechanical change factors of both photoconductors and drive rollers.

Additional aspects of the disclosure will be set forth in part in the description which follows and, in part, will be apparent from the description, or may be learned by practice of the disclosure.

In accordance with one aspect of the present disclosure, a control method of an image forming apparatus which has photoconductors, an intermediate transfer belt to which developers attached to the photoconductors are transferred, and drive rollers to drive the intermediate transfer belt, includes printing test patterns on the intermediate transfer belt by adjusting a printing time interval of the test patterns according to a spatial period of the photoconductors and a spatial period of the drive rollers, if conditions to execute auto color registration (ACR) are satisfied, and executing ACR according to a signal reflected by the test patterns.

The printing of the test patterns on the intermediate transfer belt by adjusting the printing time interval of the test patterns according to the spatial period of the photoconductors and the spatial period of the drive rollers may include printing the test patterns by an interval of a value obtained by dividing a spatial period corresponding to the least common multiple of the spatial period of the photoconductors and the spatial period of the drive rollers by K.

The printing of the test patterns by the interval of the value obtained by dividing the spatial period corresponding to the least common multiple of the spatial period of the photoconductors and the spatial period of the drive rollers by K may include printing K test patterns of one color from among a plurality of colors used in the image forming apparatus by the interval of the value.

The printing of the test patterns on the intermediate transfer belt by adjusting the printing time interval of the test patterns according to the spatial period of the photoconductors and the spatial period of the drive rollers may include printing basic test patterns or combinational test patterns on the intermediate transfer belt by adjusting a printing time interval.

The execution of ACR according to the signal reflected by the test patterns may include executing ACR in a paper feeding direction according to a signal reflected by the basic test patterns, if the basic test patterns are printed on the intermediate transfer belt.

The execution of ACR in the paper feeding direction according to the signal reflected by the basic test patterns may include measuring distances between test patterns of a color serving as a criterion from among a plurality of colors used in the image forming apparatus and test patterns of other colors, and calculating compensation values as the arithmetic averages of the distances.

The execution of ACR according to the signal reflected by the test patterns may include executing ACR in a main scanning direction according to a signal reflected by the combinational test patterns, if the combinational test patterns are printed on the intermediate transfer belt.

The execution of ACR in the main scanning direction according to the signal reflected by the combinational test patterns may include measuring distances between neighboring test patterns of a color serving as a criterion from among a plurality of colors used in the image forming apparatus and distances between neighboring test patterns of other colors, calculating differences between the distances between the neighboring test patterns serving as the criterion and the distances between the neighboring test patterns of the other colors having the same sequence numbers, and calculating compensation values as the arithmetic averages of the differences between the distances.

In accordance with another aspect of the present disclosure, an image forming apparatus which has photoconductors, an intermediate transfer belt to which developers attached to the photoconductors are transferred, and drive rollers to drive the intermediate transfer belt, includes a sensor unit to transmit light to test patterns printed on the intermediate transfer belt and to receive light reflected by the test patterns, a color registration compensation unit to execute auto color registration (ACR) according to a test pattern sensing signal transmitted from the sensor unit, and a control unit to print the test patterns on the intermediate transfer belt by adjusting a printing time interval of the test patterns according to a spatial period of the photoconductors and a spatial period of the drive rollers.

The control unit may print the test patterns by an interval of a value obtained by dividing a spatial period corresponding to the least common multiple of the spatial period of the photoconductors and the spatial period of the drive rollers by K.

The control unit may print basic test patterns or combinational test patterns on the intermediate transfer belt by adjusting a printing time interval.

The control unit may execute ACR in a paper feeding direction according to a signal reflected by the basic test patterns, if the basic test patterns are printed on the intermediate transfer belt.

The control unit may measure distances between test patterns of a color serving as a criterion from among a plurality of colors used in the image forming apparatus and test patterns of other colors, and calculate compensation values as the arithmetic averages of the distances.

The control unit may execute ACR in a main scanning direction according to a signal reflected by the combinational test patterns, if the combinational test patterns are printed on the intermediate transfer belt.

The control unit may measure distances between neighboring test patterns of a color serving as a criterion from among a plurality of colors used in the image forming apparatus and distances between neighboring test patterns of other colors, calculate differences between the distances between the neighboring test patterns serving as the criterion and the distances between the neighboring test patterns of the other colors having the same sequence numbers, and calculate compensation values as the arithmetic averages of the differences between the distances.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a view illustrating calculation of compensation values using the combinational test patterns printed on the intermediate transfer belt of the image forming apparatus in accordance with the embodiment of the present disclosure;

FIGS. 14 to 16 are views illustrating various examples of adjustment of a printing interval of printed test patterns if the image forming apparatus in accordance with the embodiment of the present disclosure executes auto color registration.

DETAILED DESCRIPTION

Figure 1:
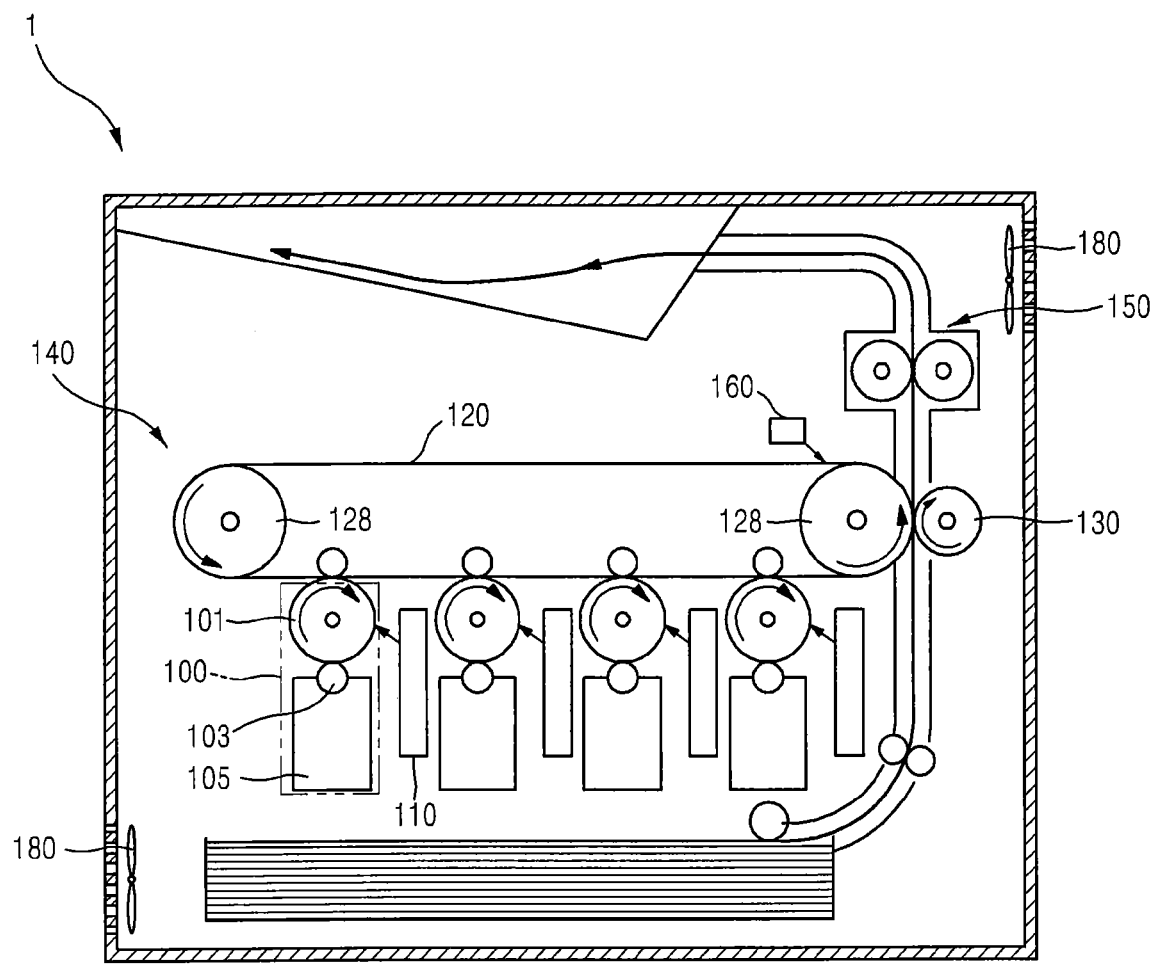
FIG. 1 is a view illustrating the configuration of an image forming apparatus in accordance with one embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating the configuration of an image forming apparatus in accordance with one embodiment of the present disclosure.

An image forming apparatus 1 in accordance with this embodiment of the present disclosure includes developing devices 100 in which developers are stored, exposure units 110 to forming electrostatic latent images on photoconductors 101 of the developing devices 100, an intermediate transfer belt 120 to which the developers on the photoconductors 101 are transferred, a transfer roller 130 to transfer a visible image on the intermediate transfer belt 120 to a printing medium, a cleaning unit 140 to remove waste developers which are not transferred to the printing medium and remain on the surface of the intermediate transfer belt 120, a fusing device 150 to fix the image finally transferred to the printing medium, a sensor unit 160 to sense an amount of light during auto color registration (ACR) of the image forming apparatus 1, and a fan 180 to cool the inside of the image forming apparatus 1.

The photoconductor 101 is provided by coating the outer circumferential surface of a metal drum having a cylindrical shape with a photoconductive material layer by a method, such as deposition. If the photoconductive material layer is exposed by the exposure unit 110, the photoconductive material layer reacts with light, thus forming an electrostatic latent image. The photoconductor 101 contacts a charge roller (not shown), and is charged by the charge roller so that one region of the outer circumferential surface of the photoconductor 101 has a uniform potential value.

The plural photoconductors 101 are provided so as to form images according to colors. The plural photoconductors 101 corresponding to four colors, e.g., yellow (Y), magenta (M), cyan (C) and black (B), may be provided. The photoconductors 101 corresponding to plural colors other than four colors may be provided. For example, the photoconductors 101 corresponding to the four colors, e.g., Y, M, C and B, and two colors, e.g., light cyan (Lc) and light magenta (Lm), may be provided.

A developing roller 103 supplies a developer to the electrostatic latent image of the photoconductor 101. The developer supplied from the developing roller 103 is attached to the electrostatic latent image.

The exposure unit 110 irradiates light onto the photoconductor 101 according to printing data, thus forming the electrostatic latent image. The exposure unit 110 forms the electrostatic latent image corresponding to a spot having a designated size according to sizes of a light source.

The intermediate transfer belt 120 forms a designated visible image through overlapping of the images of the respective colors formed by the developing devices 100. The intermediate transfer belt 120 finally transfers the visible image to a printing medium moving between the transfer roller 130 and the intermediate transfer belt 120. Drive rollers 128 are installed on the inner circumferential surface of the intermediate transfer belt 120. The drive rollers 128 are connected to drive sources (not shown), receive power from the drive sources (not shown), and move the intermediate transfer belt 120 using the received power.

The transfer roller 130 compresses the printing media to the intermediate transfer belt 120 so that the visible image formed on the intermediate transfer belt 120 may be finally transferred to the printing media. The transfer roller 130 is opposite to the drive roller 128 across the intermediate transfer belt 120, and is rotated in a direction opposite to the rotating direction of the drive roller 128.

The sensor unit 160 is provided on a path of the intermediate transfer belt 120 and senses light reflected by test patterns. The sensor unit 140 may be an optical sensor including a light emitting part and a light receiving part. A result sensed by the sensor unit 160 is transmitted to a color registration compensation unit 220, which will be described alter, and is used in ACR.

Figure 2:
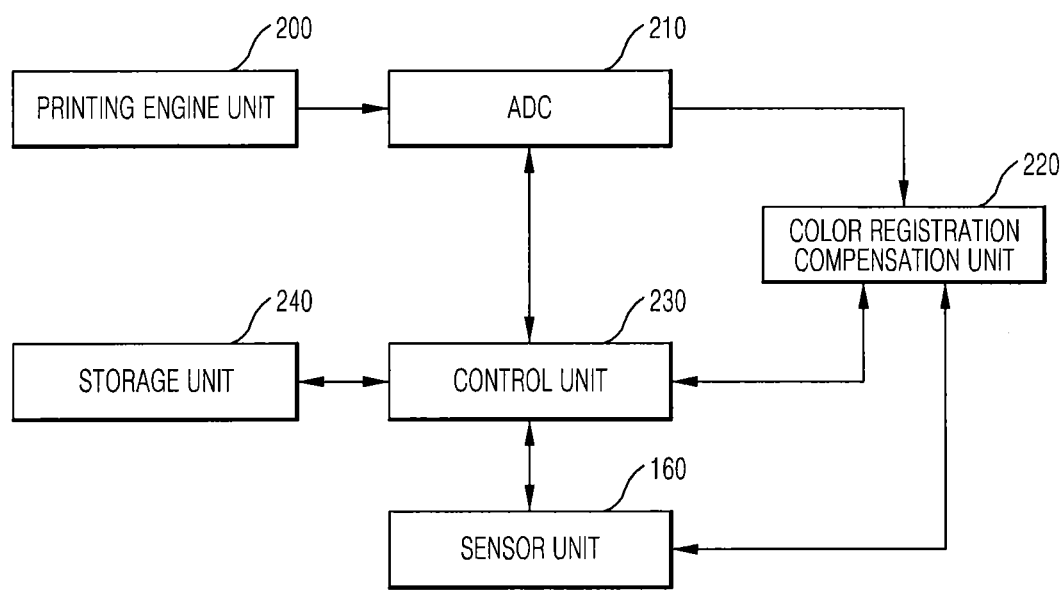
FIG. 2 is a control block diagram of the image forming apparatus in accordance with the embodiment of the present disclosure.

FIG. 2 is a control block diagram of the image forming apparatus in accordance with the embodiment of the present disclosure.

The image forming apparatus 1 includes a printing engine unit 200, an analog/digital conversion unit 210, the color registration compensation unit 220, a control unit 230, a storage unit 240, and the sensor unit 160.

The printing engine unit 200 includes the developing devices 100, the exposure units 110, the intermediate transfer belt 120, the transfer roller 130, and the fusing device 150.

The analog/digital conversion unit 210 converts analog data output from the sensor unit 160 into digital data. The light receiving part of the sensor unit 160 receives light reflected by test patterns and outputs a voltage value, and such a voltage value is analog data.

Figure 3A:
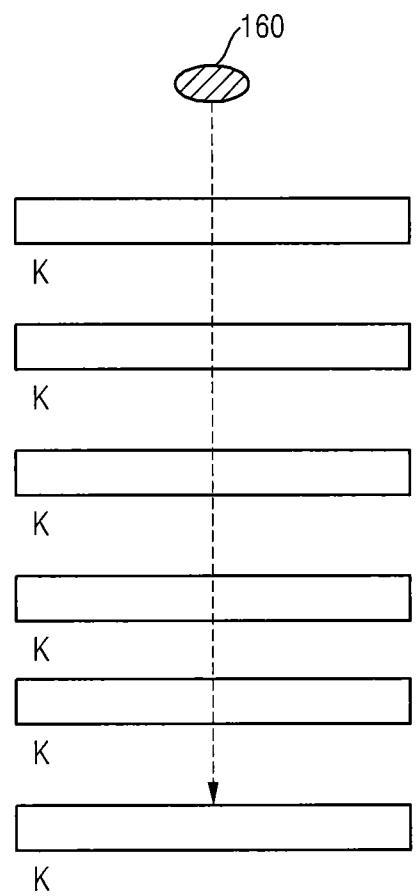
FIGS. 3A and 3B are views illustrating basic test patterns and combinational test patterns, respectively.
Figure 3B:
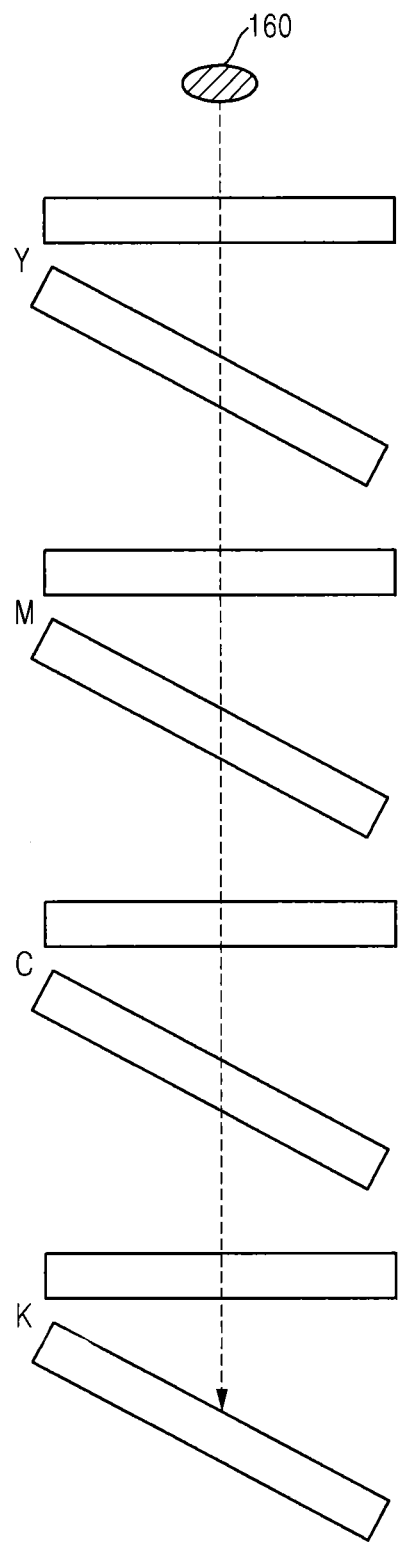

The color registration compensation unit 220 receives a test pattern sensing signal transmitted from the sensor unit 160, and recognizes the position of a color image pattern based on the test pattern sensing signal. The test patterns may be basic test patterns shown in FIG. 3A, or be combinational test patterns shown in FIG. 3B.

The color registration compensation unit 220 may calculate a registration error by comparing an actual position of the test pattern with a reference position, and calculates a compensation value according to the registration error.

Figure 4:
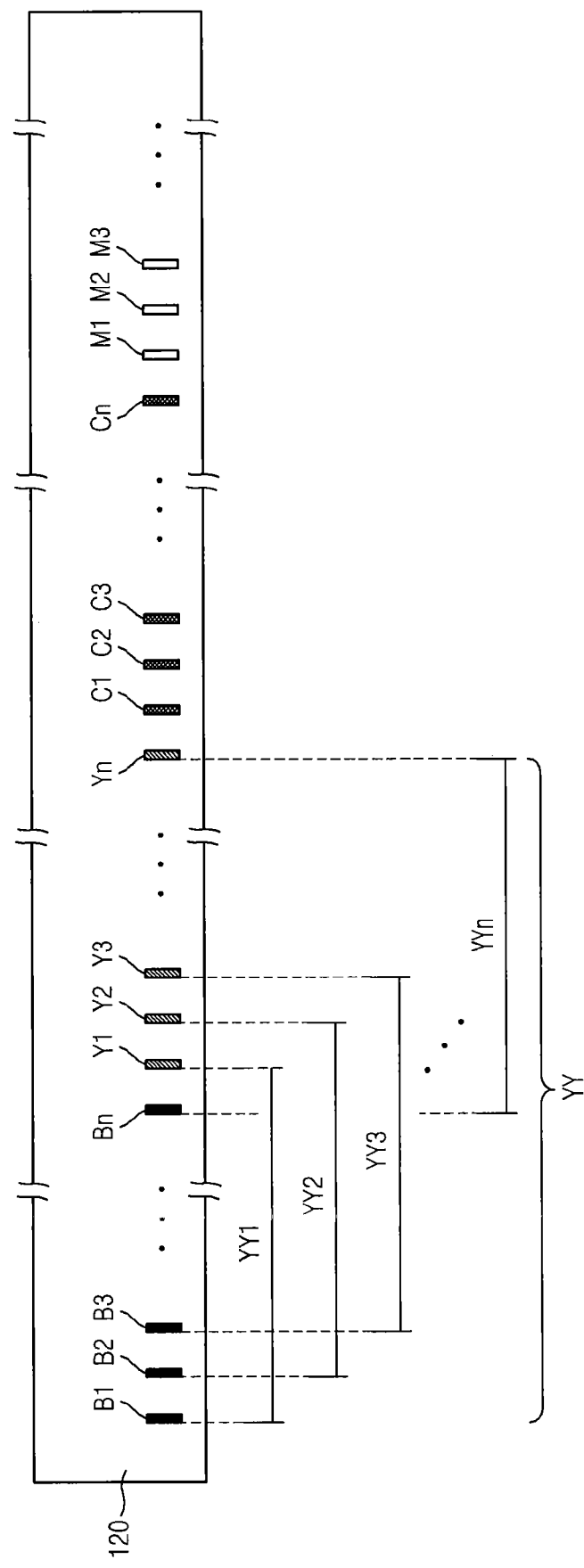
FIG. 4 is a view illustrating calculation of compensation values using the basic test patterns printed on an intermediate transfer belt of the image forming apparatus in accordance with the embodiment of the present disclosure.

With reference to FIG. 4, basic test patterns to calculate compensation values in a paper feeding direction are transferred to the intermediate transfer belt 120. Test patterns of one color (for example, black) serving as a criterion and test patterns of another color (for example, yellow) are transferred to the intermediate transfer belt 120.

The color registration compensation unit 220 calculates distances between the black test patterns and the yellow test patterns having the same sequence numbers according to a color sensing signal transmitted from the sensor unit 160. The color registration compensation unit 220 calculates the arithmetic average YY of n distances YY1, YY2, ..., YYn, as stated in Equation 1 below.

$$YY=(YY1+YY2+\ldots+YYn)/n \qquad \text{Equation 1}$$

The color registration compensation unit 220 employs the average value YY calculated from Equation 1 as a compensation value to compensate for a color registration error between black and yellow in the paper feeding direction. The color registration compensation unit 220 calculates compensation values between black and magenta and between black and cyan using the same method.

With reference to FIG. 5, combinational test patterns to calculate compensation values in a main scanning direction are transferred to the intermediate transfer belt 120. Test patterns of one color (for example, black) serving as a criterion and test patterns of another color (for example, yellow) are transferred to the intermediate transfer belt 120.

The color registration compensation unit 220 calculates distances XB1, XB2, ..., XBn between neighboring black test patterns and distances XY1, XY2, ..., XYn between neighboring yellow test patterns according to a color sensing signal transmitted from the sensor unit 160. The color registration compensation unit 220 respectively calculates differences XYe1, XYe2, ..., XYen between the distances between the neighboring black test patterns and the distances between neighboring yellow test patterns having the same sequence numbers. The color registration compensation unit 220 calculates the arithmetic average XY of the n calculated differences, as stated in Equation 2 below.

$$XY=(XYe1+XYe2+\ldots+XYen)/n \qquad \text{Equation 2}$$

The color registration compensation unit 220 employs the average value XY calculated from Equation 2 as a compensation value to compensate for a color registration error between black and yellow in the main scanning direction. The color registration compensation unit 220 calculates compensation values between black and magenta and between black and cyan using the same method.

The control unit 230 drives the drive rollers 128 at a designated velocity to rotate the intermediate transfer belt 120, when the conditions to execute ACR are satisfied. The control unit 230 controls the printing engine unit 200 so that plural test patterns according to respective colors are printed on the rotated intermediate transfer belt 120.

The control unit 230 adjusts a printing time interval of the test patterns to calculate the color registration errors under the condition that velocity change according to cross-sectional shapes of the drive rollers 128 and the photoconductors 101 is excluded, when the plural test patterns according to the respective colors are printed on the intermediate transfer belt 120. If the drive rollers 128 and the photoconductors 101 do not have a round-shaped cross section, a line velocity is changed, and change of the line velocity of the drive rollers 128 and the photoconductors 101 influences the test patterns printed on the intermediate transfer belt 120.

Figure 6A:
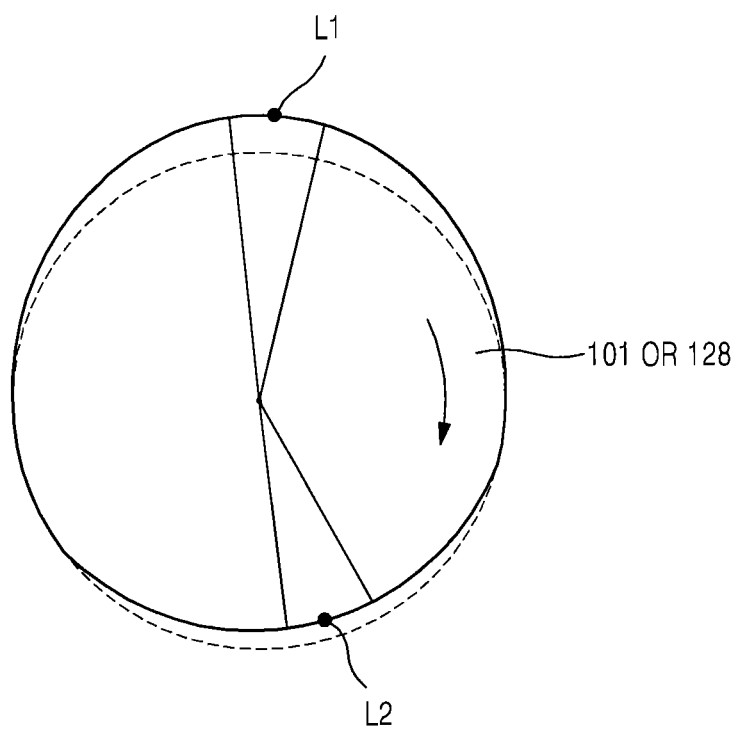
FIG. 6A is a view illustrating the shape of a photoconductor or a drive roller.
Figure 6B:
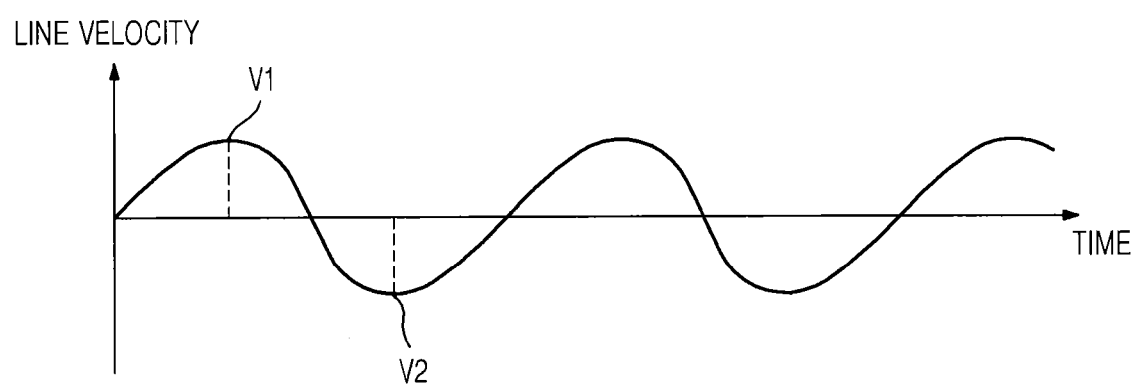
FIG. 6B is a graph illustrating change of a linear velocity if the drive roller of the photoconductor does not have a round shape.

With reference to FIGS. 6A and 6B, the line velocity V1 at a convex portion L1 on the surface of the photoconductor 101 of the drive roller 128 is relatively high, and the line velocity V2 at a concave portion L2 on the surface of the photoconductor 101 or the drive roller 128 is relatively low. Thereby, it is understood that, when the basic patterns are transferred onto the intermediate transfer belt 120 by a designated interval and then a registration error δL is measured, the registration error δL is changed according to spatial period components of the drive roller 128 and the photoconductor 101.

Figure 7A:
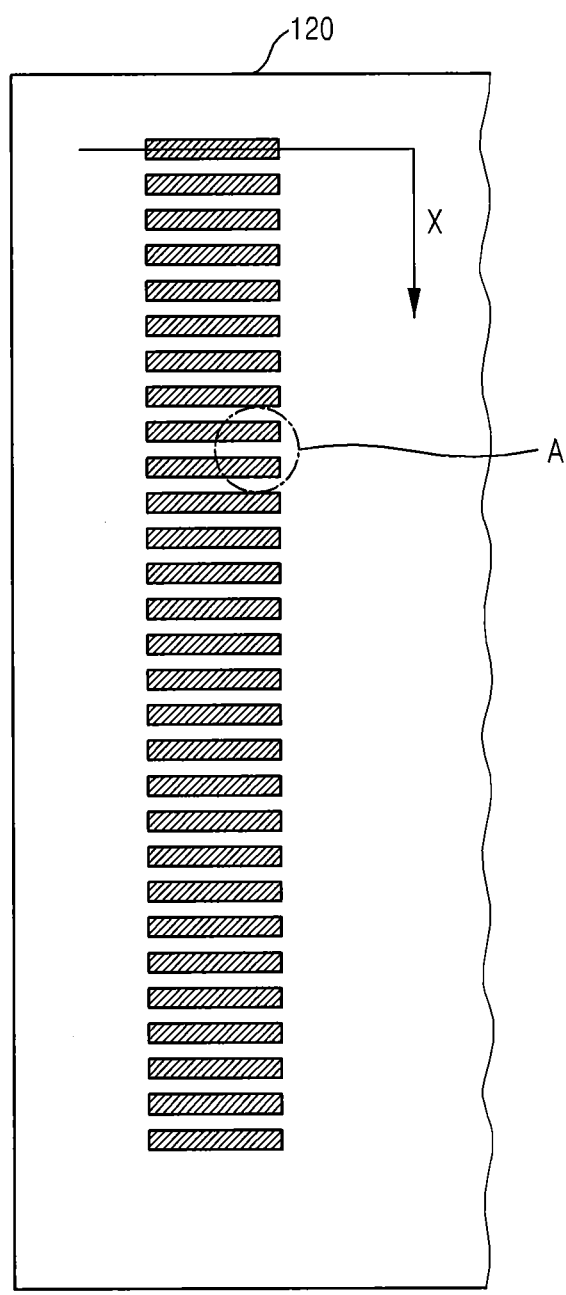
FIG. 7A is a view illustrating printing of the basic test patterns by a designated time interval on the intermediate transfer belt of the image forming apparatus in accordance with the embodiment of the present disclosure.
Figure 7B:
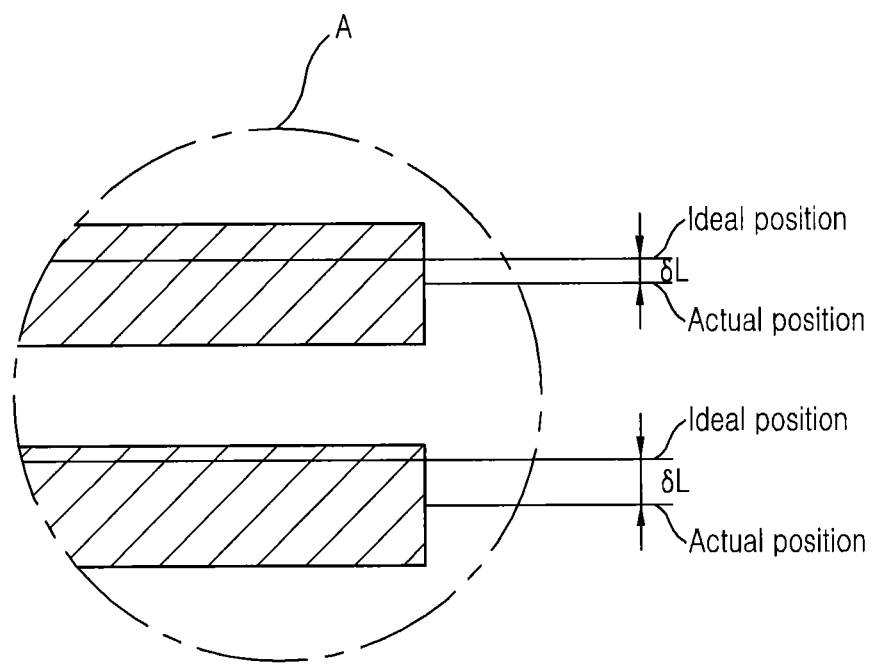
FIG. 7B is a view illustrating change of the size of a registration error of the test patterns of the FIG. 7A.
Figure 7C:
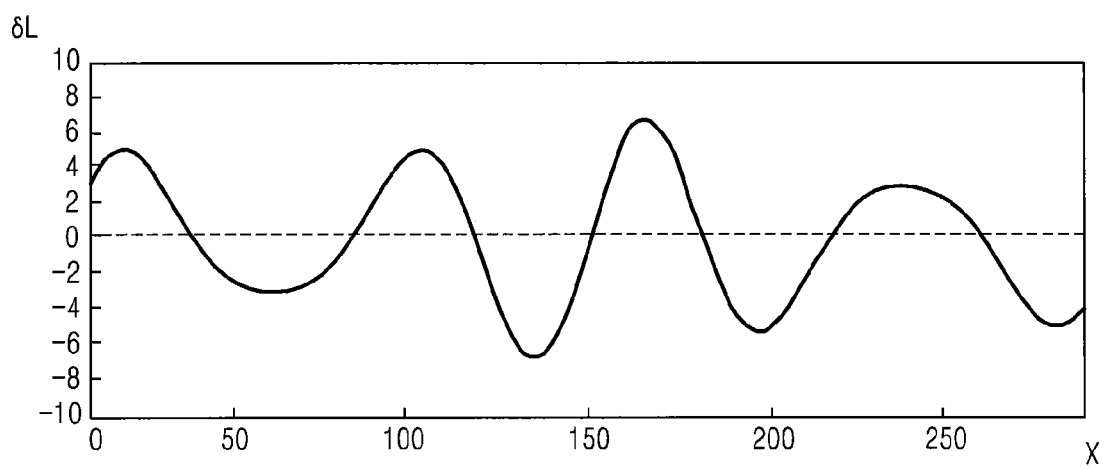
FIG. 7C is a graph illustrating a variation of the registration error in a paper feeding direction of the intermediate transfer belt of the image forming shown in FIG. 7B.

With reference to FIGS. 7A to 7C, FIG. 7A is a view illustrating printing of the basic test patterns by a designated time interval on the intermediate transfer belt 120, FIG. 7B is a view illustrating different registration errors δL, e.g., differences between actual positions and ideal positions of two test patterns out of the basic test patterns transferred to the intermediate transfer belt 120, and FIG. 7C is a graph illustrating a variation of the registration error δL in the paper feeding direction.

From FIG. 7C, it is understood that the registration error δL is repeatedly raised and lowered in the paper feeding direction, and this is caused by the mechanical shape of the drive rollers 128 and the photoconductors 101, as described above.

Through ACR, registration errors both in the paper feeding direction and in the main scanning direction are compensated. Hereinafter, a method of compensating for the registration errors in the paper feeding direction will be exemplarily described, but the embodiment of the present disclosure may be applied to a method of compensating for the registration errors in the main scanning direction.

Hereinafter, a method of compensating for registration errors in the paper feeding direction if the spatial period of the photoconductors 101 and the spatial period of the drive rollers 128 are equal will be described.

Figure 8A:
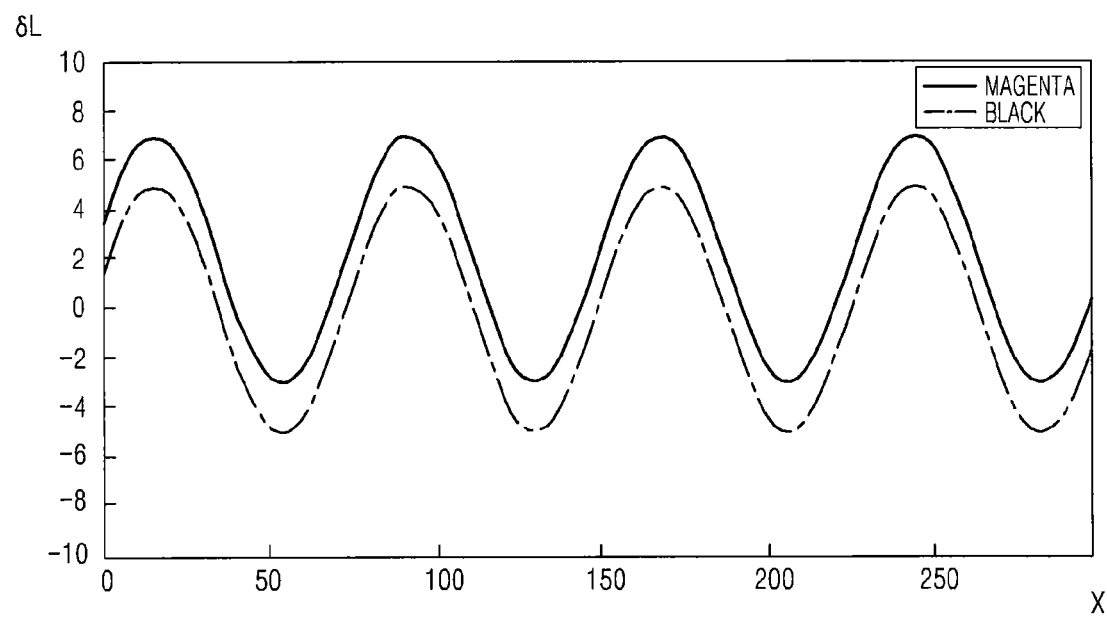
FIG. 8A is a graph illustrating a difference between a registration error of one color serving as a criterion and a registration error of another color in the test patterns printed on the intermediate transfer belt of the image forming apparatus in accordance with the embodiment of the present disclosure.
Figure 8B:
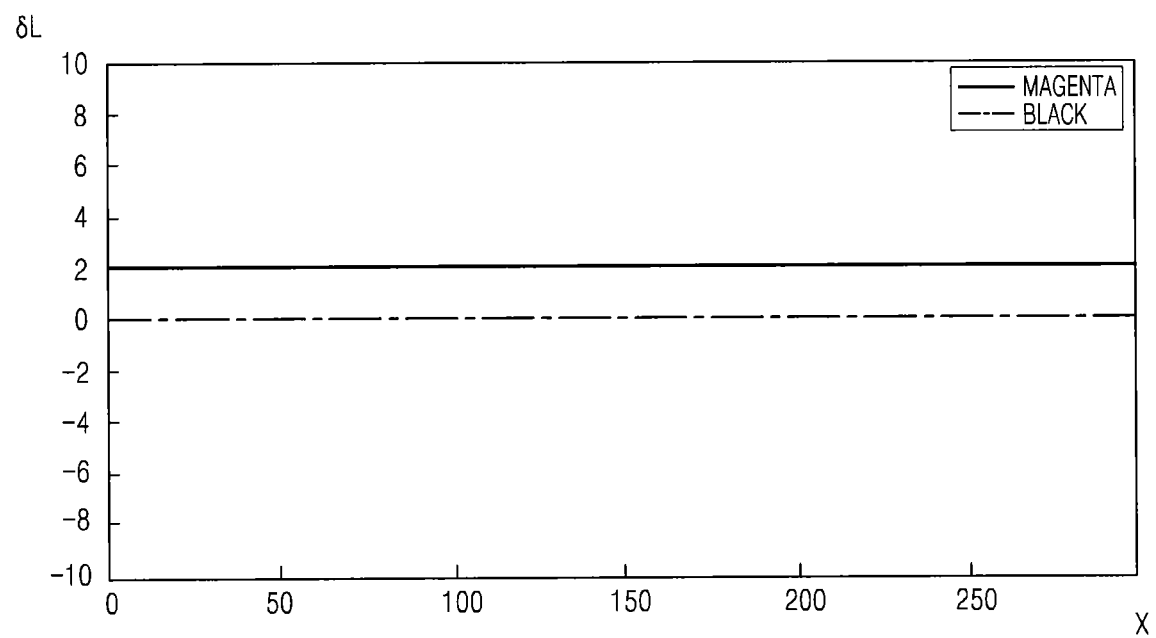
FIG. 8B is a graph illustrating the arithmetic averages of the registration errors of the two colors shown in FIG. 8A.

FIGS. 8A and 8B are graphs illustrating registration errors of one color serving as a criterion and registration errors of another color.

In the graphs, two registration error curves of two colors have the same phase but there is a difference between the average values of the registration errors. ACR in the paper feeding direction serves to remove a difference between the average value of registration errors of one color serving as the criterion and the average value of registration errors of another color.

Figure 9A:
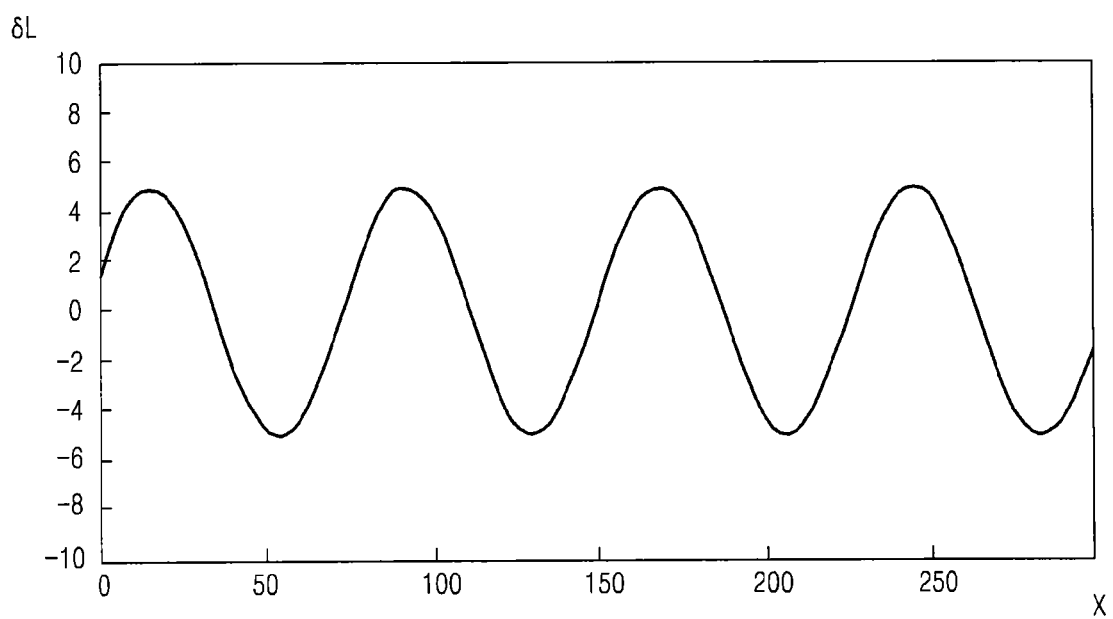
FIG. 9A is a graph illustrating the same phase and amplitude of registration errors, if there is no difference between a registration error of one color serving as a criterion and a registration error of another color in the test patterns printed on the intermediate transfer belt of the image forming apparatus in accordance with the embodiment of the present disclosure.
Figure 9B:
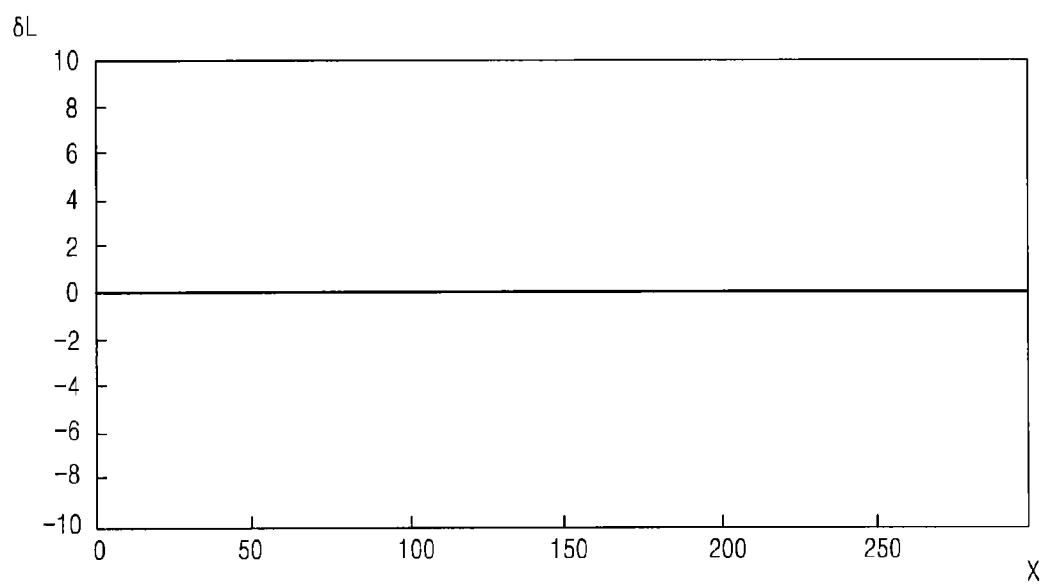
FIG. 9B is a graph illustrating the arithmetic averages of the registration errors of the two colors shown in FIG. 9A.

FIGS. 9A and 9B are graphs illustrating a state in which the difference of the average values of the registration errors between the color serving as the criterion and the other color is removed. The difference between the average value of the color serving as the criterion and the average value of the other color is defined as a DC offset.

Figure 10A:
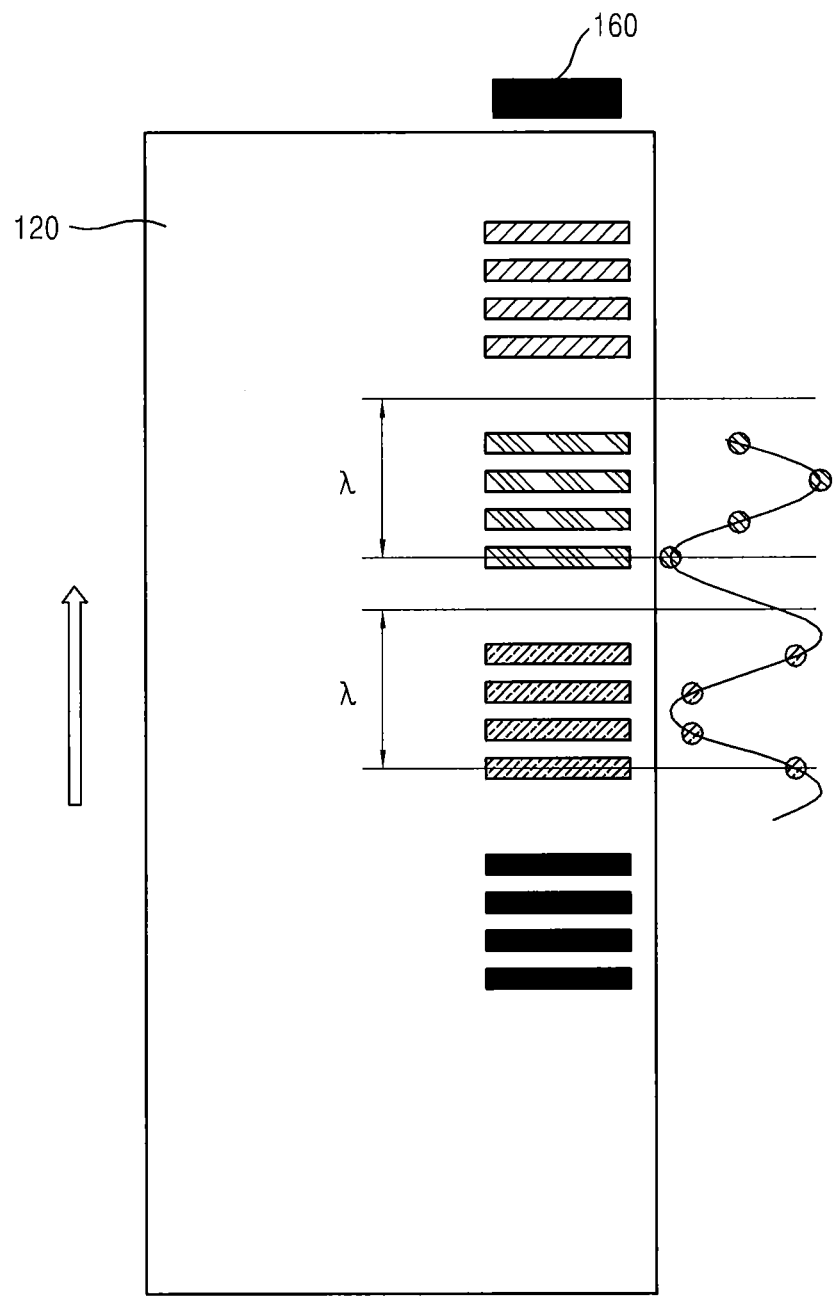
FIG. 10A is a view illustrating printing test patterns of one color serving as a criterion and test patterns of other colors to execute auto color registration in the image forming apparatus in accordance with the embodiment of the present disclosure.

With reference to FIG. 10A, test patterns of one color serving as the criterion and test patterns of other colors are transferred to the intermediate transfer belt 120. Here, N patterns of each of the colors are transferred to the intermediate transfer belt 120 by an interval of λ/N, i.e., an interval of a value obtained by dividing the spatial period λ of the registration error δL in the paper transfer direction by N (for example, N=4).

Figure 10B:
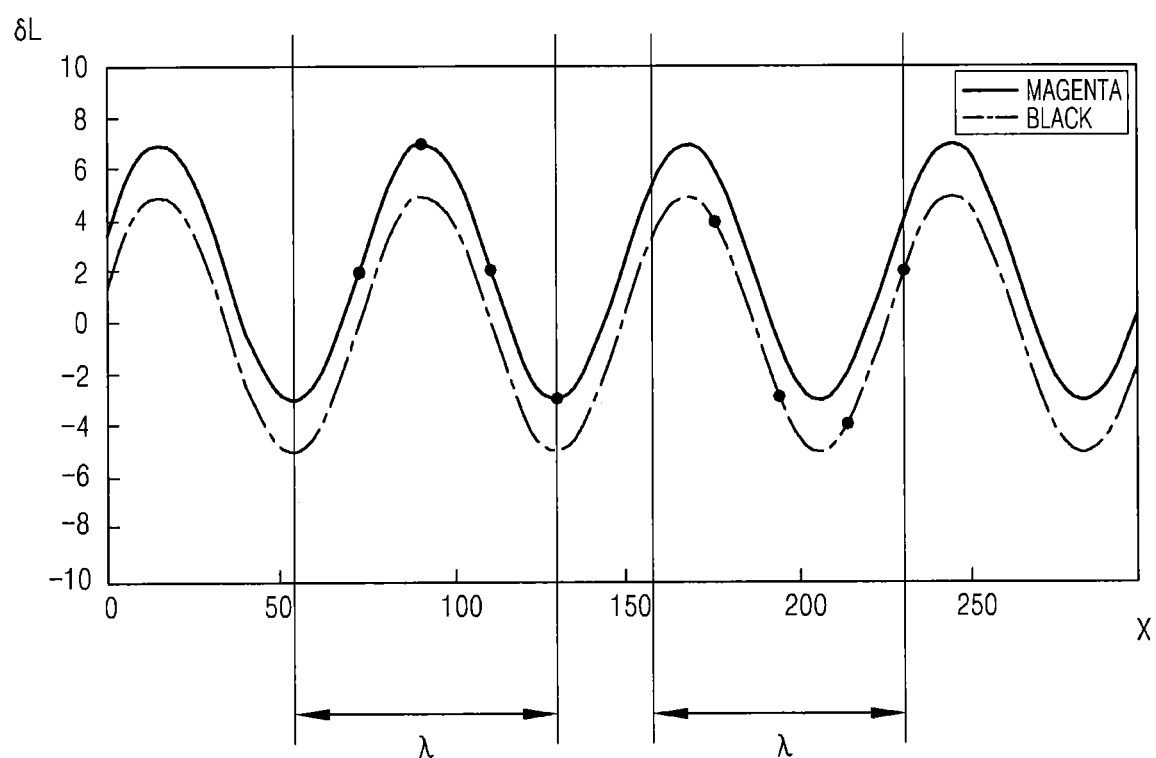
FIG. 10B is a graph illustrating registration errors of the test patterns shown in FIG. 10A in the paper feeding direction.

The color registration compensation unit 220 calculates the average value of registration errors of one color serving as the criterion and the average value of registration errors of another color, in order to compensate for registration errors in the paper feeding direction. The average values of the registration errors shown in FIG. 10B are calculated by Equation 3 below.

$$\text{Average value of registration errors of black (color serving as the criterion)} = \{4.33 + (-2.50) + (-4.33) + 2.50\}/4 = 0$$

$$\text{Average value of registration errors of magenta (another color)} = \{2 + 7 + 2 + (-3)\}/4 = 2 \quad \text{Equation 3}$$

Since a DC offset between the two colors due to Equation 3 is 2, a point of time at which magenta is exposed is delayed by 2, the DC offset between the two colors is removed.

Figure 11:
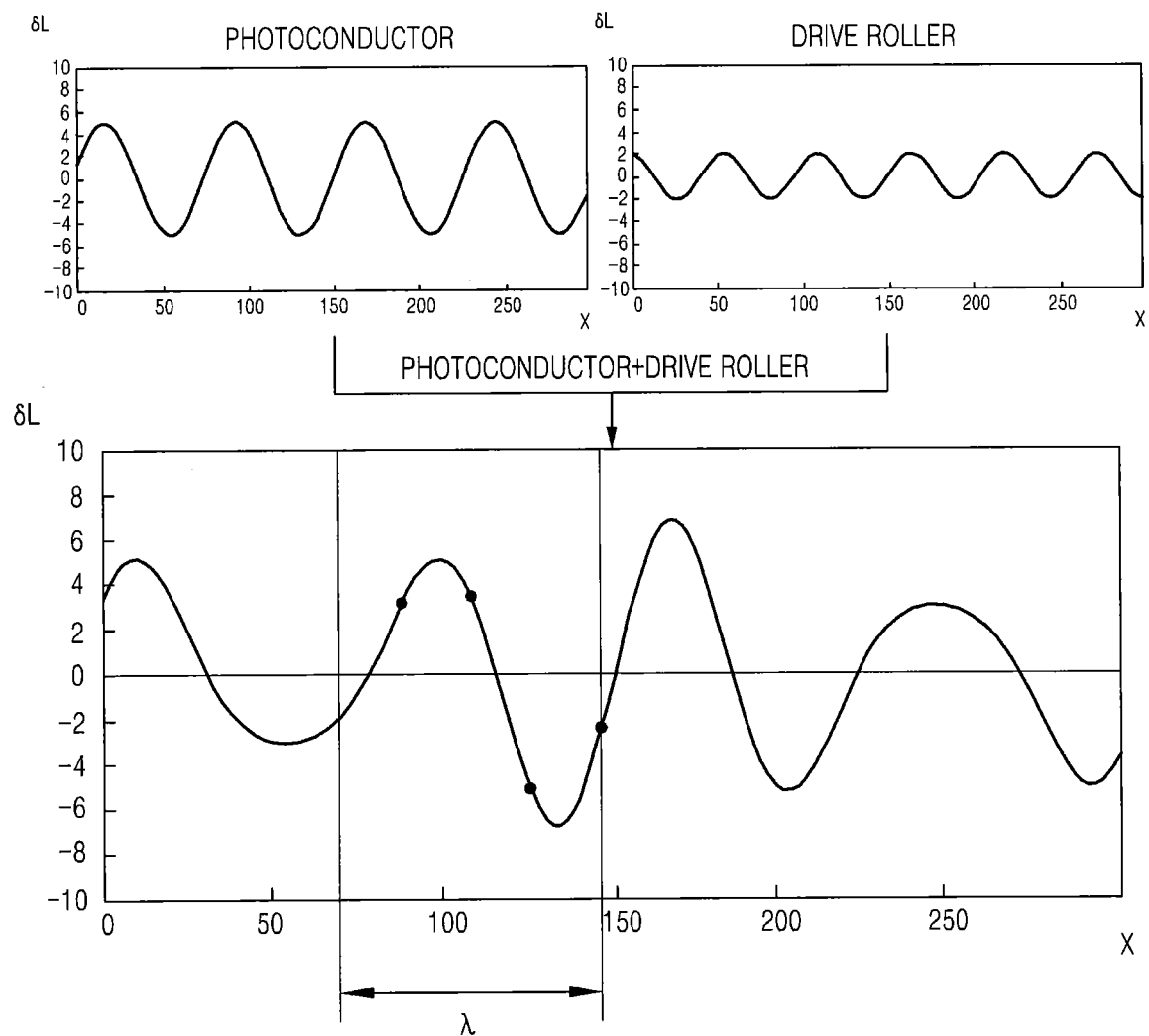
FIG. 11 is a graph illustrating generation of a new spatial period of registration errors through combination of a spatial period component of a registration error of the photoconductor and a spatial period component of a registration error of the drive roller of the image forming apparatus in accordance with the embodiment of the present disclosure.

The registration error compensation method stated in Equation 3 is applied if the spatial period of the photoconductors 101 and the spatial period of the drive rollers 128 are equal, and is not applied if the spatial period of the photoconductors 101 and the spatial period of the drive rollers 128 are not equal. With reference to FIG. 11, both a spatial period component (AC component) of the photoconductors 101 due to the mechanical shape thereof and a spatial period component (AC component) of the drive rollers 128 due to the mechanical shape thereof influence a registration error curve in the paper feeding direction. In this case, if test patterns are printed in consideration of the spatial period of one of the photoconductors 101 and the drive rollers 128, the average value of registration errors does not represent the central value of the registration error curve, as stated in Equation 4.

$$\text{Average value of registration errors} = \{3.35 + 3.47 + (-5.77) + (-2.16)\}/4 = 0.28 \neq 0 \quad \text{Equation 4}$$

Here, it is considered that the average value of registration errors normally needs to be "0" in terms of mechanical characteristics. Thereby, when the average value of registration errors calculated by Equation 4 is used as a value to calculate a DC offset, ACR is abnormally executed. Therefore, the control unit 230 adjusts a printing interval of test patterns in consideration of both the spatial period of the drive rollers 128 and the spatial period of the photoconductors 101.

Accordingly, the control unit 230 may adjust a transfer interval of test patterns of one color to L/K obtained by dividing the least common multiple L of the spatial period λ1 of the photoconductors 101 and the spatial period λ2 of the drive rollers 128 by K, as stated in Equation 5.

(1) L32 λ1*N=λ2*M, (N and M being natural numbers)

(2) K being a natural number other than 1, and not being factors of N and M (3) Transfer interval of test patterns of one color=L/K  Equation 5

(1) of Equation 5 serves to calculate a new spatial period obtained by reflecting the spatial period of the photoconductors 101 and the spatial period of the drive rollers 128 on the transfer interval of the test patterns using the least common multiple of the two spatial periods. When the diameter of the photoconductors 101 is D1, the spatial period λ1 of the photoconductors 101 becomes D1*π, and when the diameter of the drive rollers 128 is D2, the spatial period λ2 of the drive rollers 128 becomes D2*π. Here, the spatial period is a term in which the concept of a period is applied to spatial change, and has the same meaning as a wavelength. The spatial periods of the photoconductors 101 and the drive rollers 128 represent periods of spatial change of the shapes thereof, and are the same as periods of registration errors in the registration error curves in the paper feeding direction. Further, the spatial periods of the photoconductors 101 and the drive rollers 128 are predetermined values to which diameters of the photoconductors 101 and the drive rollers 128 during designing are reflected as boundary values thereof during designing.

Figure 12:
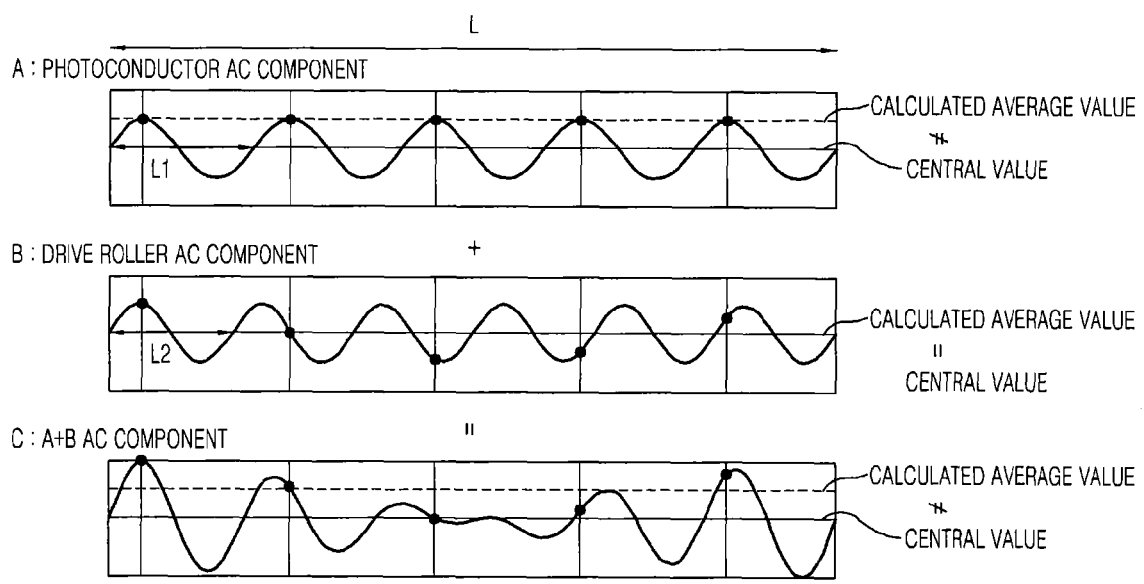
FIG. 12 is a graph illustrating the range of K when test patterns are printed with a spatial period corresponding to the least common multiple of the spatial periods in the registration error graphs of the photoconductors and the drive rollers, if the image forming apparatus in accordance with the embodiment of the present disclosure executes auto color registration.

(2) of Equation 5 represents the number K of test patterns of one color to be transferred to the intermediate transfer belt 120 during one spatial period. The number K of test patterns may be designed to employ the number of patterns predetermined by the control unit 120 or the number of patterns randomly set. Here, K is a natural number other than 1 and factors of N and M. With reference to FIG. 12, the reason why K is a natural number other than 1 and factors of N and M will be described.

In FIG. 12, the spatial period λ1 of the photoconductors 101 is 6π, the spatial period λ2 of the drive rollers 128 is 5π, and the least common multiple L of the spatial period λ1 of the photoconductors 101 and the spatial period λ2 of the drive rollers 128 is 30π. Since L=5*λ1=6*λ2, N is 5 and M is 6. Thereby, according to Equation 5, K needs to be a natural number other than 1, 2, 3, 5 and 6. If K is one value out of 1, 2, 3, 5 and 6, the averages of registration errors of test patterns do not represent the central values of the registration error curves. For example, it is understood that, if K is 5, the average value of registration errors of the photoconductors 101 differs from the central value of the registration error curve of the photoconductors 101 and the average value of registration errors of the drive rollers 128 is equal to the central value of the registration error curve of the drive rollers 128. Thereby, the average value of registration errors calculated in a new registration error curve formed by combination of the registration error curve of the photoconductors 101 and the registration error curve of the drive rollers 128 differs from the central value of the new registration error. The reason for this is that, if K is 1 or factors of N and M, the value of Zk=e1Kθ is overlapped with an imaginary number part and the spatial period is not divided by K.

(3) of Equation 5 represents that K test patterns are transferred at a transfer interval, obtained by dividing the least common multiple L of the spatial period of the photoconductors 101 and the spatial period of the drive rollers 128 by K.

Figure 13A:
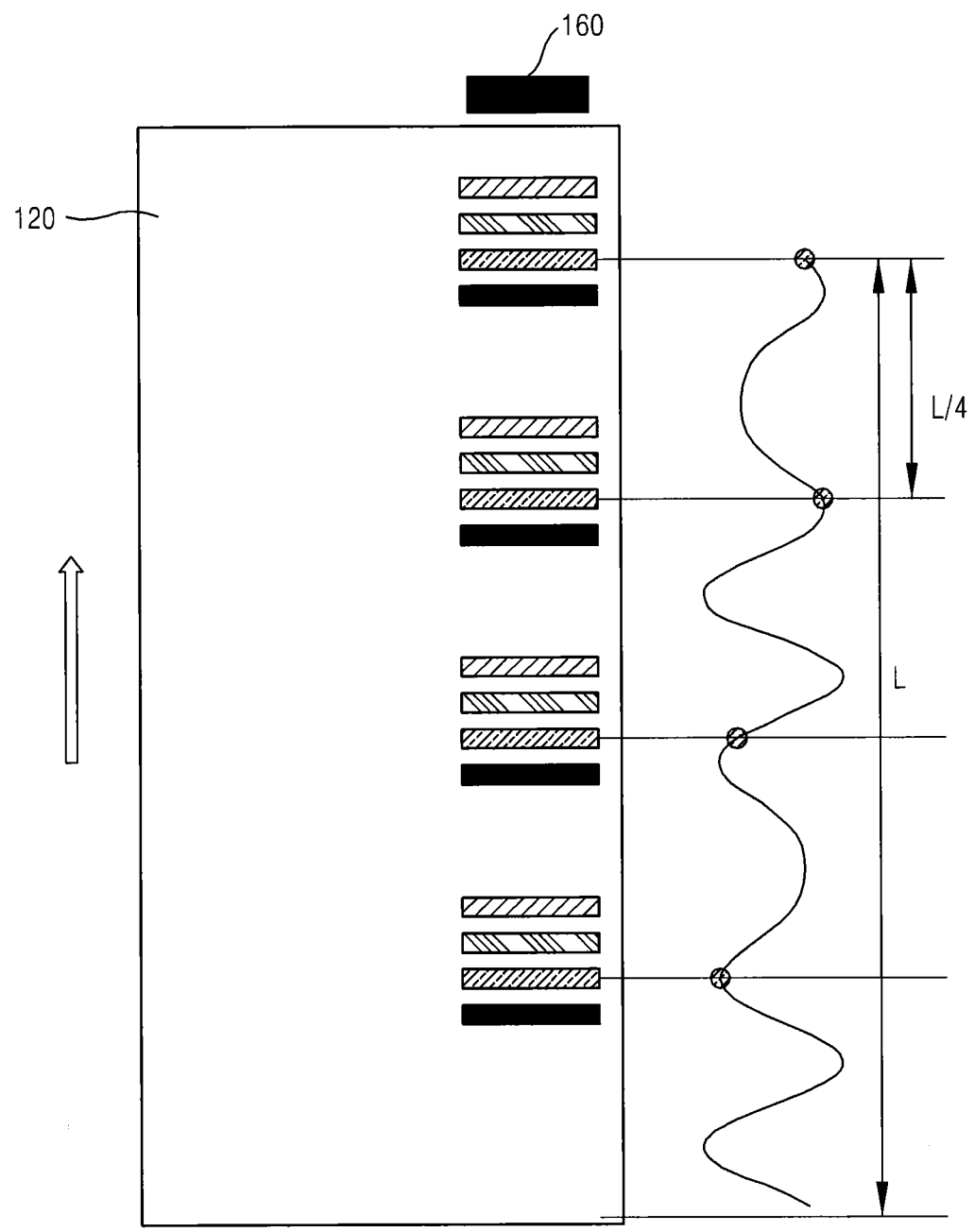
FIG. 13A is a view illustrating adjustment of a printing interval of test patterns in consideration of both the spatial period of the registration error of the photoconductors and the spatial period of the registration error of the drive rollers, if the image forming apparatus in accordance with the embodiment of the present disclosure executes auto color registration.
Figure 13B:
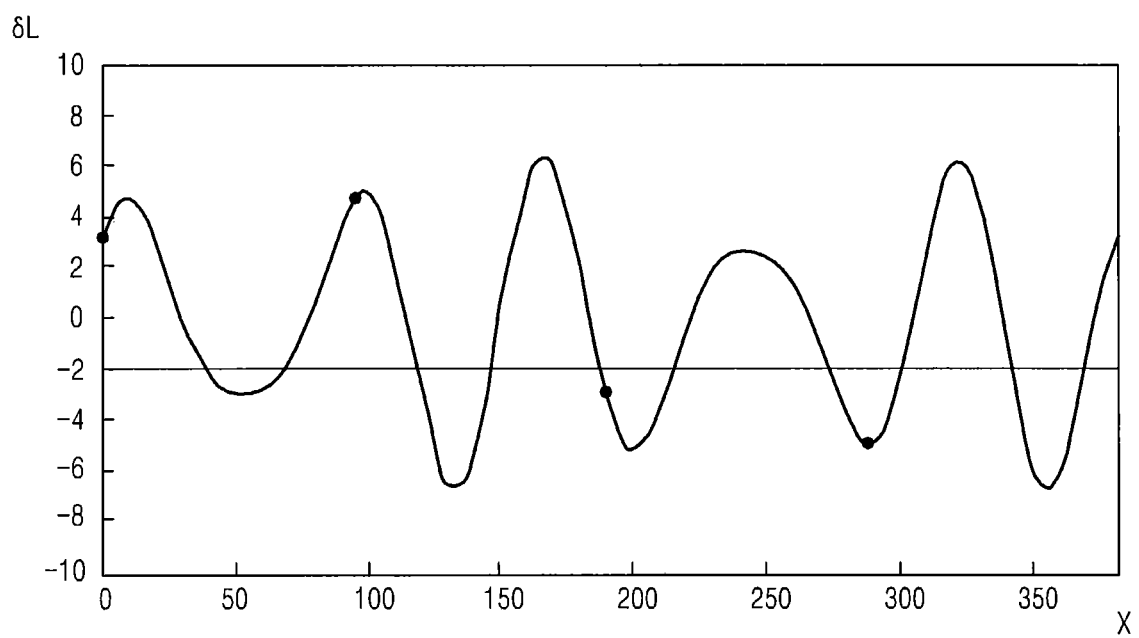
FIG. 13B is a graph illustrating a registration error of the test patterns shown in FIG. 13A.

FIG. 13A is a view illustrating transfer of test patterns on the intermediate transfer belt of the image forming apparatus in accordance with the embodiment of the present disclosure in consideration of both the spatial period of the photoconductors and the spatial period of the drive rollers, and FIG. 13B is a graph illustrating registration errors of the test patterns transferred to the intermediate transfer belt shown in FIG. 13A in the paper feeding direction.

The control unit 230 sets the value of K to 4 and controls transfer of test patterns such that four test patterns are transferred by an interval of L/4, obtained by dividing the least common multiple of the spatial period λ1 of the photoconductors 101 and the spatial period λ2 of the drive rollers 128 by 4. The four test patterns mean plural test patterns of one color. As shown in FIG. 13A, the test patterns of one color between test patterns of other colors may be transferred by an interval of L/4.

The color registration compensation unit 220 calculates the average value of registration errors of the four test patterns, as shown in FIG. 13B.

Average value of registration errors={3.12+4.85+(−3.22)+(−4.80)}/4=−0.01  Equation 6

As stated in Equation 6, the calculated average value of the registration errors becomes (−0.01), which is close to 0, and thus is nearly close to the central value of the registration error curve. The registration error curve of FIG. 13B is designed so that the central value of the registration error curve becomes 0, and illustrates effects of the embodiment of the present disclosure by comparing the calculated average value of the registration errors with 0.

Hereinafter, various examples of test patterns printed on the intermediate transfer belt to execute ACR in the image forming apparatus in accordance with the embodiment of the present disclosure will be described with reference to FIGS. 14 to 16.

FIG. 14 is a view illustrating transfer of test patterns to the intermediate transfer belt 120 to execute ACR. FIG. 14 illustrates test patterns transferred to the intermediate transfer belt 120 by a transfer interval determined by specifications stated in Equation 7 below.

Spatial period of photoconductors: 30π

Spatial period of drive rollers: 24π

Least common multiple of spatial period of photoconductors and spatial period of drive rollers: 120π

K=3, 6, 7, 8, . . . (here, K is set to 3)

Transfer interval of test patterns=L/3=40π  Equation 7

Figure 15:
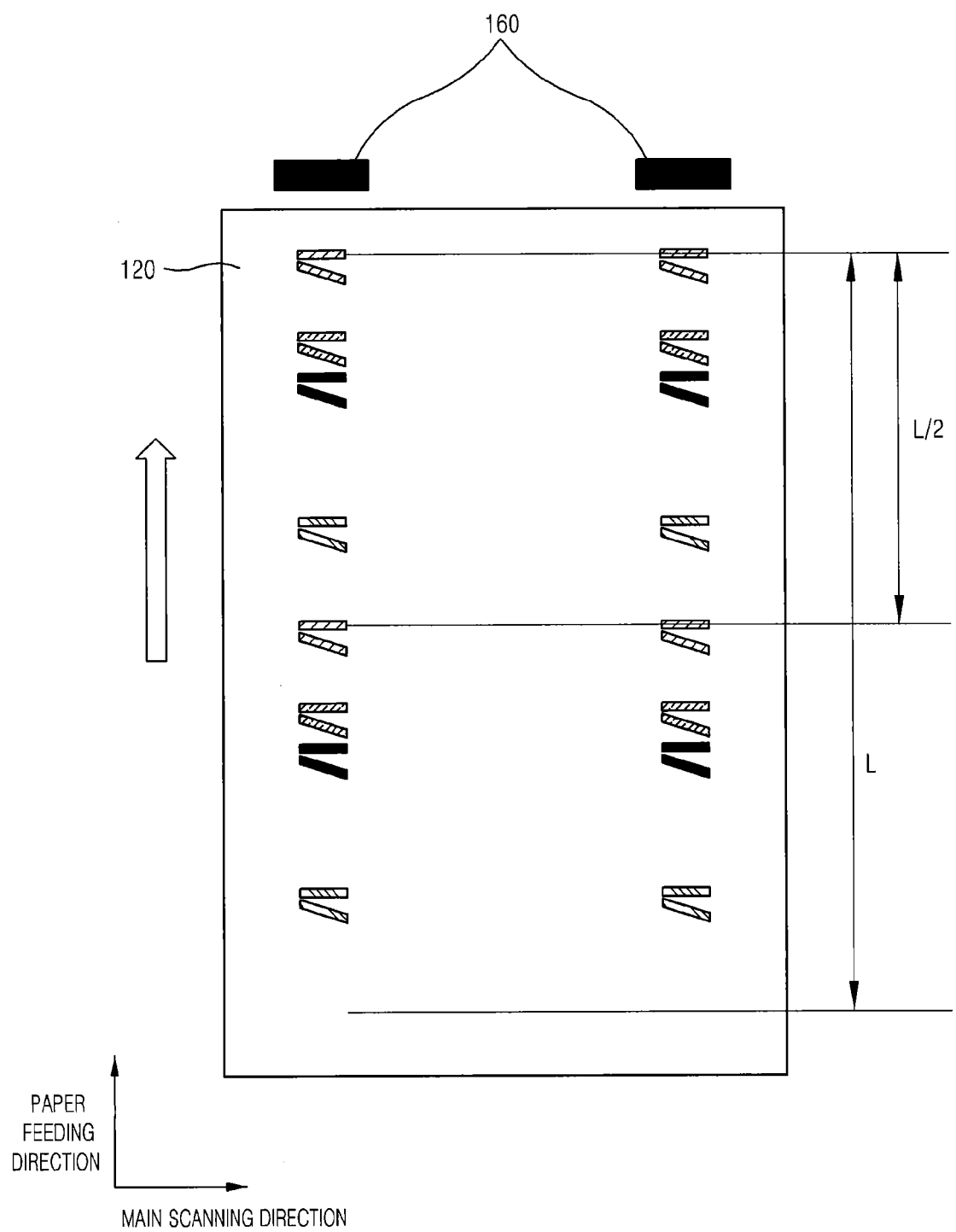

FIG. 15 is a view illustrating transfer of test patterns to the intermediate transfer belt 120 to execute ACR. FIG. 15 illustrates test patterns transferred to the intermediate transfer belt 120 by a transfer interval determined by specifications stated in Equation 8 below.

Spatial period of photoconductors: 30π

Spatial period of drive rollers: 10π

Least common multiple of spatial period of photoconductors and spatial period of drive rollers: 30π

K=2, 4, 5, 6, . . . (here, K is set to 2)

Transfer interval of test patterns=L/2=15π  Equation 8

Figure 16:
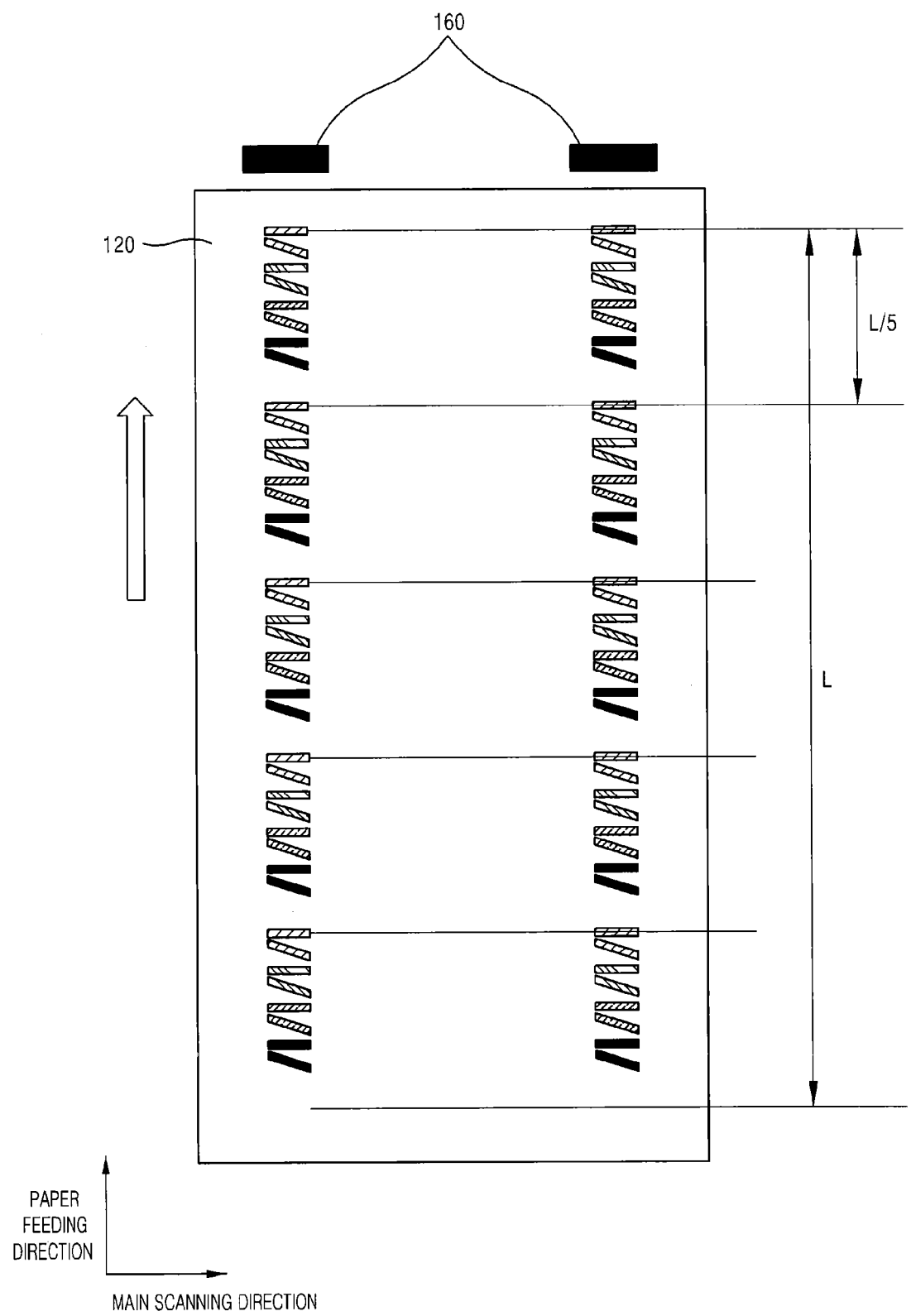

FIG. 16 is a view illustrating transfer of test patterns to the intermediate transfer belt 120 to execute ACR. FIG. 16 illustrates test patterns transferred to the intermediate transfer belt 120 by a transfer interval determined by specifications stated in Equation 9 below.

Spatial period of photoconductors: $30\pi$

Spatial period of drive rollers: $15\pi$

Least common multiple of spatial period of photoconductors and spatial period of drive rollers: $30\pi$ K=3, 4, 5, 6, ... (here, K is set to 5)

Transfer interval of test patterns=$L/2=6\pi$  Equation 9

Figure 17:
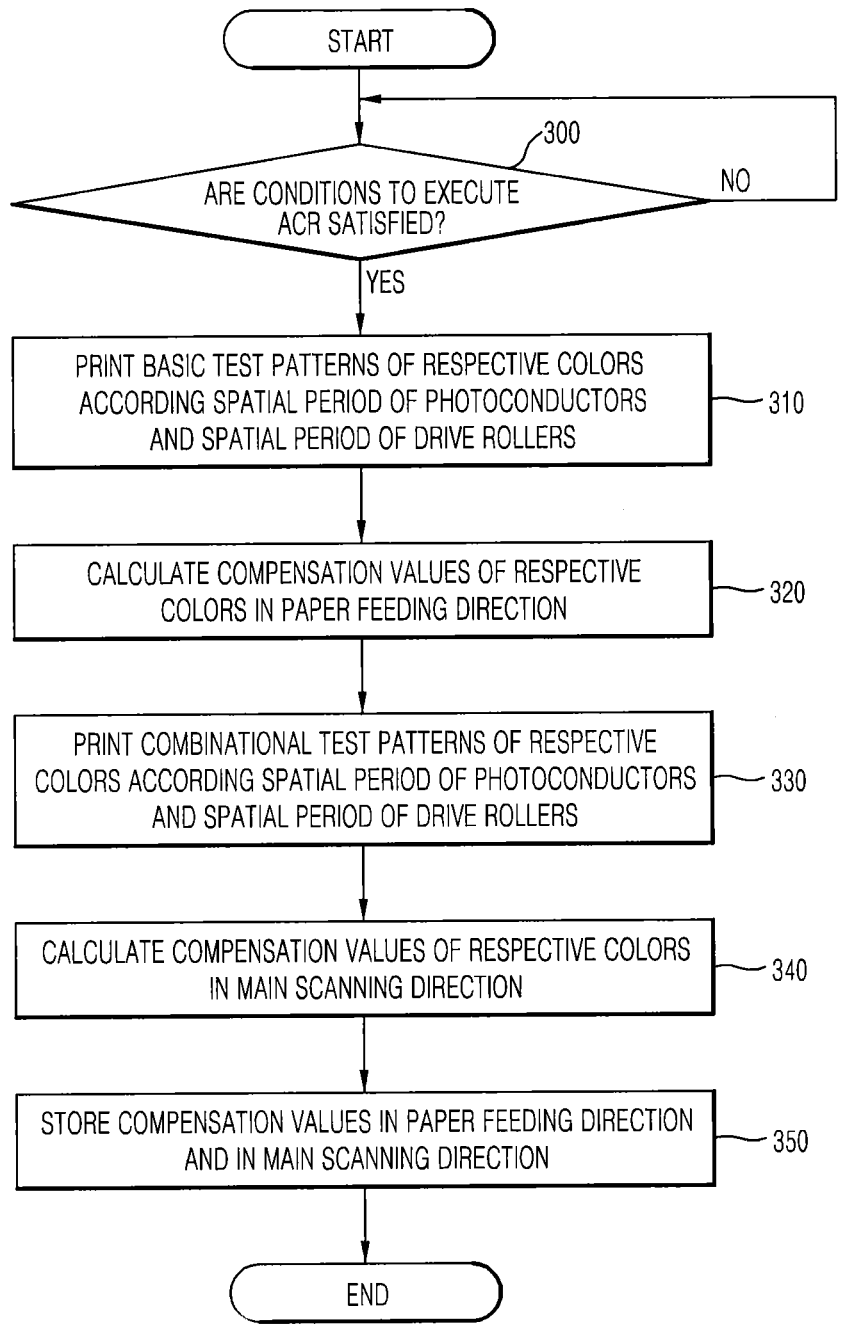
FIG. 17 is a flowchart illustrating execution of auto color registration of the image forming apparatus in accordance with the embodiment of the present disclosure.

FIG. 17 is a flowchart illustrating execution of auto color registration of the image forming apparatus in accordance with the embodiment of the present disclosure.

The control unit 230 judges whether or not the conditions to execute ACR are satisfied. The conditions to execute ACR may include a case in which one of the developing devices using toners of four colors, such as yellow, magenta, cyan and black, is replaced, a case in which a cover of the image forming apparatus 1 is opened or closed, and a case in which the total number of printed sheets of paper becomes twice a set number. (Operation 300)

The control unit 230 drives the drive rollers 240 at a designated velocity to rotate the intermediate transfer belt 120, upon judging that the conditions to execute ACR are satisfied. The control unit 230 controls the printing engine unit 200 to print basic test patterns on the intermediate transfer belt 120 to compensate for color registration errors in the paper feeding direction. The control unit 230 prints K test patterns by setting the least common multiple of the spatial period of the photoconductors 101 and the spatial period of the drive rollers 128 as one spatial period and dividing the set spatial period by K. (Operation 310)

The sensor unit 160 is provided on a path of the intermediate transfer belt 120 and senses light reflected by the test patterns. The sensor unit 160 senses light reflected by n basic black test patterns and n basic yellow, magenta and cyan test patterns printed on the intermediate transfer belt 120, and transmits the sensed light to the color registration compensation unit 220.

The color registration compensation unit 220 receives a signal from the sensor unit 160, measures distances between the black test patterns and the other color test patterns having the same sequence numbers, and calculates the arithmetic average values of the distances. The color registration compensation unit 220 sets the calculated arithmetic values as compensation values of the respective colors in the paper feeding direction. (Operation 320)

The control unit 230 drives the drive rollers 240 at a designated velocity, and controls the printing engine unit 200 to print combinational test patterns on the intermediate transfer belt 120 to compensate for color registration errors in the main scanning direction. The control unit 230 prints K test patterns by setting the least common multiple of the spatial period of the photoconductors 101 and the spatial period of the drive rollers 128 as one spatial period and dividing the set spatial period by K. (Operation 330)

The color registration compensation unit 220 receives a signal from the sensor unit 160, measures distances between the neighboring black test patterns and distances between the neighboring other color test patterns, respectively calculates differences between the distances between the neighboring black test patterns and the distances between the neighboring other color test patterns having the same sequence numbers, and calculates the arithmetic average values of the calculated differences. The color registration compensation unit 220 sets the calculated arithmetic values as compensation values of the respective colors in the main scanning direction. (Operation 340)

The color registration compensation values in the paper feeding direction and the color registration compensation values in the main scanning direction calculated by the color registration compensation unit 220 are stored in the storage unit 350. (Operation 350)

As is apparent from the above description, an image forming apparatus and a control method thereof in accordance with one embodiment of the present disclosure print test patterns in consideration of both a spatial period of photoconductors and a spatial period of drive rollers, thereby more precisely measuring registration errors.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A control method of an image forming apparatus which has photoconductors, an intermediate transfer belt to which developers attached to the photoconductors are transferred, and drive rollers to drive the intermediate transfer belt, the control method comprising:
   printing test patterns on the intermediate transfer belt by adjusting a printing time interval of the test patterns according to a spatial period of the photoconductors and a spatial period of the drive rollers, if conditions to execute auto color registration (ACR) are satisfied; and
   executing ACR according to a signal reflected by the test patterns,
   wherein the printing of the test patterns on the intermediate transfer belt by adjusting the printing time interval of the test patterns according to the spatial period of the photoconductors and the spatial period of the drive rollers includes printing the test patterns by an interval of a value obtained by dividing a spatial period corresponding to the least common multiple of the spatial period of the photoconductors and the spatial period of the drive rollers by K, K being a natural number other than 1.

2. The control method according to claim 1, wherein the printing of the test patterns by the interval of the value obtained by dividing the spatial period corresponding to the least common multiple of the spatial period of the photoconductors and the spatial period of the drive rollers by K includes printing K test patterns of one color from among a plurality of colors used in the image forming apparatus by the interval of the value.

3. A control method of an image forming apparatus which has photoconductors, an intermediate transfer belt to which developers attached to the photoconductors are transferred, and drive rollers to drive the intermediate transfer belt, the control method comprising:
   printing test patterns on the intermediate transfer belt by adjusting a printing time interval of the test patterns according to a spatial period of the photoconductors and a spatial period of the drive rollers, if conditions to execute auto color registration (ACR) are satisfied; and
   executing ACR according to a signal reflected by the test patterns,
   wherein the printing of the test patterns on the intermediate transfer belt by adjusting the printing time interval of the test patterns according to the spatial period of the photoconductors and the spatial period of the drive rollers includes printing basic test patterns or combinational test patterns on the intermediate transfer belt by adjusting a printing time interval.

4. The control method according to claim 3, wherein the execution of ACR according to the signal reflected by the test patterns includes executing ACR in a paper feeding direction according to a signal reflected by the basic test patterns, if the basic test patterns are printed on the intermediate transfer belt.

5. The control method according to claim 4, wherein the execution of ACR in the paper feeding direction according to the signal reflected by the basic test patterns includes measuring distances between test patterns of a color serving as a criterion from among a plurality of colors used in the image forming apparatus and test patterns of other colors, and calculating compensation values as the arithmetic averages of the distances.

6. The control method according to claim 3, wherein the execution of ACR according to the signal reflected by the test patterns includes executing ACR in a main scanning direction according to a signal reflected by the combinational test patterns, if the combinational test patterns are printed on the intermediate transfer belt.

7. The control method according to claim 6, wherein the execution of ACR in the main scanning direction according to the signal reflected by the combinational test patterns includes:
 measuring distances between neighboring test patterns of a color serving as a criterion from among a plurality of colors used in the image forming apparatus and distances between neighboring test patterns of other colors; and
 calculating differences between the distances between the neighboring test patterns serving as the criterion and the distances between the neighboring test patterns of the other colors having the same sequence numbers, and calculating compensation values as the arithmetic averages of the differences between the distances.

8. An image forming apparatus which has photoconductors, an intermediate transfer belt to which developers attached to the photoconductors are transferred, and drive rollers to drive the intermediate transfer belt, comprising:
 a sensor unit to transmit light to test patterns printed on the intermediate transfer belt and to receive light reflected by the test patterns;
 a color registration compensation unit to execute auto color registration (ACR) according to a test pattern sensing signal transmitted from the sensor unit; and
 a control unit to print the test patterns on the intermediate transfer belt by adjusting a printing time interval of the test patterns according to a spatial period of the photoconductors and a spatial period of the drive rollers,
 wherein the control unit prints the test patterns by an interval of a value obtained by dividing a spatial period corresponding to the least common multiple of the spatial period of the photoconductors and the spatial period of the drive rollers by K, K being a natural number other than 1.

9. An image forming apparatus which has photoconductors, an intermediate transfer belt to which developers attached to the photoconductors are transferred, and drive rollers to drive the intermediate transfer belt, comprising:
 a sensor unit to transmit light to test patterns printed on the intermediate transfer belt and to receive light reflected by the test patterns;
 a color registration compensation unit to execute auto color registration (ACR) according to a test pattern sensing signal transmitted from the sensor unit; and
 a control unit to print the test patterns on the intermediate transfer belt by adjusting a printing time interval of the test patterns according to a spatial period of the photoconductors and a spatial period of the drive rollers,
 wherein the control unit prints basic test patterns or combinational test patterns on the intermediate transfer belt by adjusting a printing time interval.

10. The image forming apparatus according to claim 9, wherein the control unit executes ACR in a paper feeding direction according to a signal reflected by the basic test patterns, if the basic test patterns are printed on the intermediate transfer belt.

11. The image forming apparatus according to claim 10, wherein the control unit measures distances between test patterns of a color serving as a criterion from among a plurality of colors used in the image forming apparatus and test patterns of other colors, and calculates compensation values as the arithmetic averages of the distances.

12. The image forming apparatus according to claim 9, wherein the control unit executes ACR in a main scanning direction according to a signal reflected by the combinational test patterns, if the combinational test patterns are printed on the intermediate transfer belt.

13. The image forming apparatus according to claim 12, wherein the control unit:
 measures distances between neighboring test patterns of a color serving as a criterion from among a plurality of colors used in the image forming apparatus and distances between neighboring test patterns of other colors; and
 calculates differences between the distances between the neighboring test patterns serving as the criterion and the distances between the neighboring test patterns of the other colors having the same sequence numbers, and calculates compensation values as the arithmetic averages of the differences between the distances.

14. A method of executing auto color registration (ACR) of an image forming apparatus which has photoconductors, an intermediate transfer belt, black, yellow, magenta, and cyan developers, and drive rollers to drive the intermediate transfer belt, the method comprising:
 driving the drive rollers to rotate the intermediate transfer belt;
 printing basic test patterns on the intermediate transfer belt to compensate for color registration errors in a paper feeding direction, printing the basic test patterns comprising printing K test patterns, K being a natural number other than 1, by setting the least common multiple of the spatial period of the photoconductors and a spatial period of the drive rollers as one spatial period and dividing the set spatial period by K; and
 sensing light reflected by the test patterns, sensing the light comprising sensing light reflected by n basic black test patterns, n being a number, and n basic yellow, magenta and cyan test patterns printed on the intermediate transfer belt;
 measuring distances between the black test patterns and the other color test patterns having the same sequence numbers;
 calculating arithmetic average values of the distances; and
 setting calculated arithmetic values as compensation values of the respective colors in the paper feeding direction.

15. The method according to claim 14, further comprising:
driving the drive rollers and printing combinational test patterns on the intermediate transfer belt to compensate for color registration errors in the main scanning direction, printing the combinational test patterns including printing K test patterns by setting the least common multiple of the spatial period of the photoconductors and the spatial period of the drive rollers as one spatial period and dividing the set spatial period by K;
measuring distances between the neighboring black test patterns and distances between the neighboring other color test patterns;
respectively calculating differences between the distances between the neighboring black test patterns and the distances between the neighboring other color test patterns having the same sequence numbers;
calculating the arithmetic average values of the calculated differences; and
setting the calculated arithmetic values as compensation values of the respective colors in the main scanning direction.

16. The method according to claim 15, further comprising storing the calculated color registration compensation values.

* * * * *